Feb. 26, 1974  H. NERWIN  3,794,490
PHOTOGRAPHIC DIFFUSION TRANSFER FILM UNIT
WITH DISPOSABLE POD AND TRAP
Filed Sept. 7, 1971  3 Sheets-Sheet 3

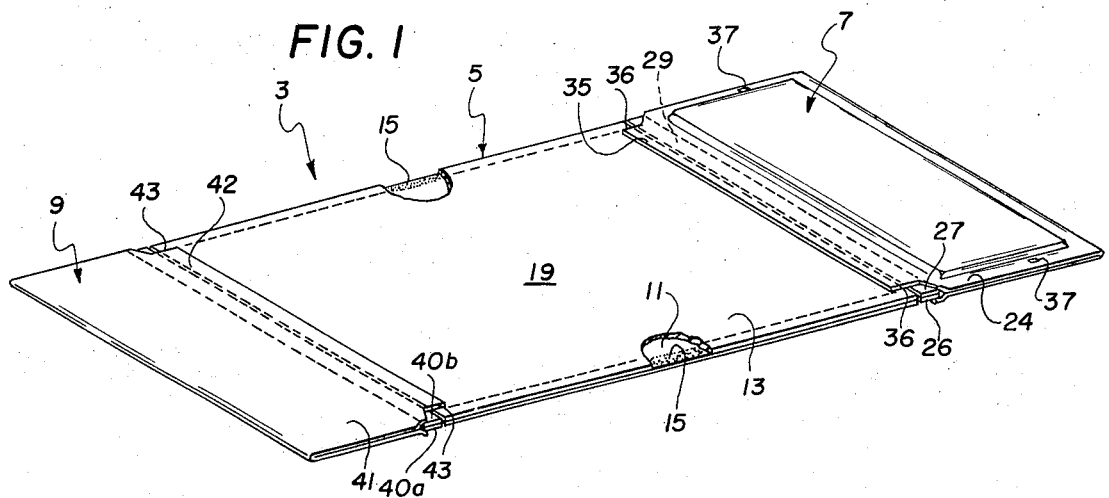

HUBERT NERWIN
INVENTOR.

BY *J. Addridj Mathew*
*W. H. J. Klein*
ATTORNEYS 3,794,490
PHOTOGRAPHIC DIFFUSION TRANSFER FILM
UNIT WITH DISPOSABLE POD AND TRAP
Hubert Nerwin, Rochester, N.Y., assignor to Eastman
Kodak Company, Rochester, N.Y.
Filed Sept. 7, 1971, Ser. No. 178,101
Int. Cl. G03c 1/48
U.S. Cl. 96—76 C                     12 Claims

ABSTRACT OF THE DISCLOSURE

A photographic film unit of the self-processing type, including an image-recording portion and reservoir means for accommodating a processing fluid. The reservoir means preferably includes a pod for supplying the processing fluid to the leading end of the recording portion, and/or a trap for collecting any excess of the fluid from its trailing end. The reservoir means is coupled to and supported on the image-recording portion in a relatively stiff manner, to facilitate handling of the film unit, and to improve certain of its other properties, but easily can be parted after processing of the film unit has been initiated, to separate the reservoir means from the image-recording portion.

BACKGROUND OF THE INVENTION

The present invention relates to photographic film units of the self-processing type, and more specifically to self-processing film units including reservoir means for accommodating a processing fluid or composition.

General features and forms of self-processing film units

While self-processing film units can take many different forms, thy generally include an imafie-recording portion and reservoir means for accommodating a processing fluid. The recording portion is defined by a photosensitive element and a process sheet; the former including one or more layers of radiation-sensitive material, for recording a processable latent image, and the latter serving as an aid for distributing the fluid over the photosensitive element to effect such processing. The reservoir means is in communication with the image-recording portion and generally includes a container, such as a pod, for supplying the processing fluid to be distributed, as well as a collector, such as a trap, for receiving any excess of the fluid after it is distributed. In operation, the film unit is moved through processing means that rupture the container, distribute its contents in a layer of appropriate thickness between the photosensitive element and process sheet, and direct any excess into the collector. The distributed fluid permeates the radiation-sensitive layers to effect processing of the latent image, and a final image is established in a manner suitable for its visual presentation.

In the most well known form of such film units, the process sheet is opaque, and initially is separated or spaced apart from the exposure side of the photosensitive element to permit its exposure. The sheet then is superposed or registered with the exposure side of the photosensitive element for processing. The visibly presentable image is established in an image-receiving layer associated with the process sheet, and that sheet is separated or peeled apart from the photosensitive element to define a reflection print. Such film units can be referred to as being of a post-registered and peel-apart type, referring, respectively, to the initial and final relative positions of the photosensitive element and process sheet. "Post-registered" identifies the feature of registration after exposure, while "peel apart" identifies the feature requiring removal of the process sheet to obtain the final print. An example of a post-registered, peel-apart film unit is illustrated and described in U.S. Pat. No. 3,080,805.

In other forms of self-processing film units, the photosensitive element and process sheet are registered or superposed prior to exposure, preferably at the time of manufacture, and remain in substantially the same condition during and after exposure and processing. The process sheet usually is transparent, to permit exposure of the photosensitive element, and remains permanently attached to the photosensitive element as part of the visibly presentable image. These last-mentioned film units can be referred to as being of a preregistered and integral type, again referring to the initial and final relative positions of the photosensitive element and process sheet. Examples of preregistered, integral film units, wherein the image-receiving layer is most closely associated with the process sheet, are disclosed in U.S. Pat. No. 3,415,644 and in British Pat. No. 1,224,372. Other examples, wherein the image-receiving layer is associated with the photosensitive element, are disclosed in commonly assigned U.S. applications Ser. No. 869,186, entitled Photographic Film Unit for Diffusion Transfer Processing, filed on Oct. 24, 1969 in the name of H. E. Cole and now abandoned (see corresponding Belgian Pat. No. 757,959); and Ser. No. 43,322, entitled Photographic Film Unit, filed on June 4, 1970 in the name of H. E. Cole now U.S. Pat. No. 3,672,272.

The present invention is illustrated and described with a preregistered, integral film unit, and has particular utility therewith. However, certain of its features also can be applied to other types of integral film units, including certain embodiments of post-registered units.

Exemplary problems often encountered with previously known self-processing film units As briefly mentioned above, self-processing film units generally are provided with reservoir means, such as a fluid container or pod, and a fluid collector or trap, for accommodating a processing fluid used to activate or effect processing of the photosensitive element. Most such means have been satisfactory before and during processing, but have, at the same time, been somewhat difficult to handle after processing has been initiated, when their primary functions are completed.

In some instances, as illustrated, for example, in the previously mentioned British patent, the reservoir means remain attached to the image-recording portion even after processing, to become a permanent part of the final print. In those instances, it is likely that the attached reservoir means will detract from the desired properties of the final print, such as its aesthetic appearance, or the equal borders usually associated with "conventional" prints. In other instances, the reservoir means are removed from the image-recording portion after processing. This has alleviated the above-mentioned aesthetic and border problems, but has resulted in several other problems often considered even more objectionable. By way of example only, the removable reservoir means often are not easy to remove, at least not without harm to the final print, and usually result in substantial waste that can not be disposed of conveniently.

SUMMARY OF THE INVENTION

A primary object of the present invention is to provide an improved self-processing film unit.

Another object of the invention is to provide a self-processing film unit including improved means for handling processing-fluid supply and/or collecting mechanisms after processing of the film unit has been initiated.

A further object of the invention is to provide a self-processing film unit including reservoir means for accommodating a processing fluid, wherein the reservoir means easily are separable from the final print after processing of the film unit has been initiated.

Yet another object of the invention is to provide a self-processing film unit wherein there is little or no likelihood that any processing fluid will escape from any of its parts before, during or after processing of the film unit.

Another object of the invention is to provide a pre-registered, integral film unit having an image-recording portion, a container or pod, and a collector or trap, wherein one or both of the container or pod and collector or trap are easily removable from the image-recording portion after processing has been initated.

In accordance with a preferred embodiment of the present invention, a self-processing film unit, having an image-recording portion, is provided with reservoir means that are securely attached to the image-recording portion when handled in one manner, but that easily can be separated from the image-recording portion when handled in another manner. This is accomplished, in accordance with one aspect of the invention, by coupling means including a first section securely attached to the image-recording portion, a second section securely attached to the reservoir means, and a third section between said first and second sections that easily is partable to separate the reservoir means from the image-recording portion. In accordance with other aspects of the invention, the coupling means also serves for directing the processing fluid between the reservoir means and the image-recording portion, for handling the film unit during processing, and for sealing the ends of the reservoir means and/or the image-recording portion after processing has been initiated. In accordance with yet another aspect of the invention, the coupling between the reservoir means and the image-recording portion can have properties such that the reservoir means will not substantially detract from the properties of the entire film unit while it is attached to the unit.

The invention, and its objects and advantages, will become more apparent in the detailed description of the preferred embodiment presented below.

BRIEF DESCRIPTION OF THE DRAWING

The above and other objects and advantages of the present invention will become more apparent to one skilled in the art from the following detailed description, read in conjunction with the attached drawings, wherein like reference numerals indicate like elements and wherein:

FIG. 1 is a pictorial view of a film unit in accordance with the present invention, illustrating the same with reservoir means, comprising a container for the processing fluid and a collector for any excess of the fluid, coupled to the leading and trailing ends of the image-recording portion, respectively.

FIG. 2 is an exploded view of the film unit depicted in FIG. 1, illustrating various components of the film unit and their manner of assembly.

DETAILED DESCRIPTION OF THE PREFERRED EMBODIMENT

Figure 3:
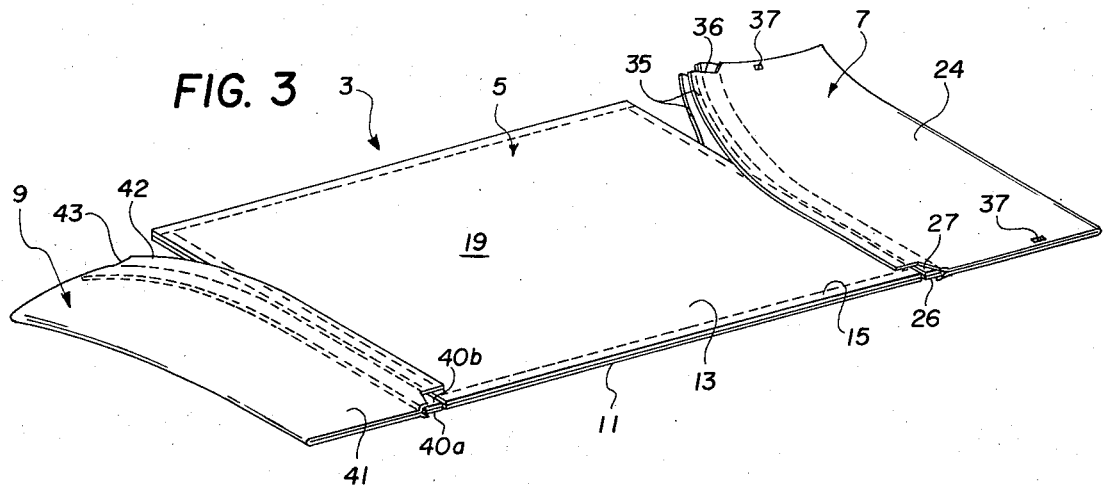
FIG. 3 is a pictorial view of the film unit depicted in FIG. 1, illustrating one manner in which the reservoir means can be separated from the image-recording portion.

Referring now to the drawings, and first to FIGS. 1 and 2, a preferred embodiment of the invention is illustrated, comprising a self-processing film unit 3 including an image-recording portion 5, and reservoir means, such as supply and collecting mechanisms 7 and 9, for accommodating a processing fluid.

The image-recording portion is adapted to record a latent image that is processable by the processing fluid, and for this purpose is provided with a first or photosensitive element 11, that is suitable for supporting the latent image, and a second element or process sheet 13, for aiding in distributing the fluid over the photosensitive element. The reservoir means, on the other hand, provides the fluid for distribution, usually with some excess, and receives any such excess for storage or disposal after the distribution is completed. Thus, it should be apparent that the film unit includes all materials necessary for recording and processing a photographic image, when used in appropriate photographic apparatus.

Image-recording portion

The preferred image-recording portion is of the pre-registered, integral type, wherein the process sheet 13 is permanently secured to the photosensitive element 11 along their lateral edges 15, and remains in substantially the same physical arrangement during exposure and after processing.

The photosensitive element 11 comprises resiliently flexible materials and includes one or more radiation sensitive layers for recording the latent image, as well as a mordant, or other appropriate layer, for receiving a visibly presentable image that is established during processing of the latent image. Since this element serves to support both the latent image and the visibly presentable image, it sometimes is referred to as an integral negative receiver.

The process sheet 13 also comprises resiliently flexible materials, and cooperates with the photosensitive element to provide a flat rectangular unit having straight edges and square corners, as well as other properties facilitating its handling in photographic apparatus. While the lateral edges of the sheet are permanently secured to the photosensitive element, as previously mentioned, the central portions are resiliently separable to permit distribution of the processing fluid, and the ends are free to permit introduction of the fluid between the element and sheet at the leading end and collection of any excess from therebetween at the trailing end.

Further details of the photosensitive element and process sheet are described and illustrated in the previously mentioned U.S. applications Ser. Nos. 869,186 and 43,322; and in commonly assigned, copending U.S. application Ser. No. 70,836, entitled Film Unit, now abandoned, and filed on Sept. 9, 1970 in the name of H. Nerwin.

Figure 5:
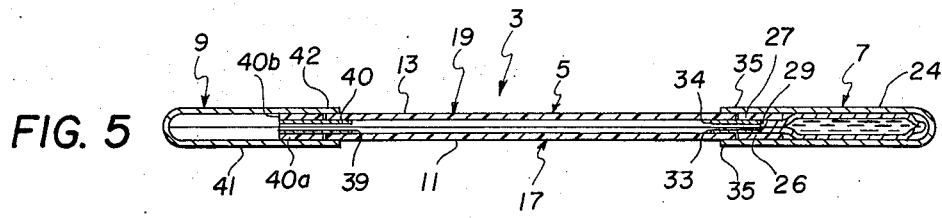

The preferred image-recording portion is adapted to be exposed and viewed from opposite sides, with the image-receiving or mordant layer being located where it is visible (in the case of a reflection print) from a first side 17 (FIG. 5), and the radiation sensitive layers from the opposite side 19 (FIGS. 1 and 5). Such viewing and exposure can be permitted by using transparent materials, both as a support for the image-receiving or mordant layer, and as the process sheet, to define substantially clear protective coverings on both sides of the recording portion.

While the major area of the image-recording portion on the first side thereof is intended to be occupied by the final print, it also will ordinarily include a white and preferably uniform border that surrounds the circumferential portions of the print in a well known manner.

Processing fluid reservoir means

The preferred fluid reservoir means includes the supply mechanism 7 for discharging the processing fluid between the photosensitive element and process sheet at the leading end of the unit, and the collecting mechanism 9 for receiving any excess of the fluid from therebetween at the trailing end.

The supply mechanism can take many different forms, ranging from those having many different parts, with each serving separate functions, to those having only one or a few parts, with each serving many functions. As illustrated in FIG. 2, the supply mechanism comprises a containing part or pod 23 of the processing fluid, a wrapper or cover 24, a funnel or conduit 25 for directing the processing fluid from the container to the image-recording portion, and elements 26 and 27 that support the pod in a relatively stiff manner at the leading end of the image-recording portion, as will be described more fully hereinafter.

Container 23 includes various vapor impervious materials, such as plastic and lead-foil layers, that cooperate with the cover or wrapper 24 to provide a structure that preferably approximates the stiffness of, or is stiffer than, the image-recording portion. The container is sealed around its periphery to provide a cavity for the processing fluid, but is adapted to release that fluid from one edge 29 upon the application to the container of a mechanical stress, usually provided by juxtaposed pressure-applying members in related photographic apparatus.

Funnel or conduit 25 is defined by adjacent sheets 33 and 34 (FIGS. 2 and 5), and includes first separable edges that receive the rupturable edge 29 of the container therebetween, as well as second contacting edges that are inserted between the separable leading ends of the photosensitive element and process sheet. The funnel is particularly well adapted for directing processing fluid discharged from the container to a location at the leading end of the image-recording portion with little or no possibility of leakage. Other features of the funnel are described hereinafter, in connection with the releasable coupling of the supply mechanism to the image-recording portion.

The wrapper or cover 24 is constructed from paper wrapped around and adhered by an adhesive 24a to the containing part 23, and by an adhesive 24b to the elements 26 and 27, for improving the appearance and physical properties of the containing part. These and other similar adhesive areas, that are applied and activated at the time of manufacture, are illustrated by the light stippled areas in FIG. 2.

At its trailing ends, the wrapper defines lips 35 that extend beyond the container, to the leading end of the image-recording portion, wheer they overlie the process sheet and photosensitive element, respectively, but without being attached thereto in any permanent manner. The lips 35 are especially adapted for use with stepped pressure-applying members, as disclosed in my previously mentioned U.S. application Ser. No. 70,836, and include cut-out portions 36 for receiving raised shoulders of the members to effect seals at the trailing end of the containing part 23, as well as at the leading end of the image-recording portion. Such sealing is accomplished during processing by activating an adhesive, or the like, in the sections to be sealed, and then by forcing the sections into permanent contacting relationship. As illustrated by the darker stippled areas in FIG. 2, representing adhesive areas activated by the processing fluid, the adhesive is applied to substantially the entire facing surfaces of funnel sheets 33 and 34, and is activated by the processing fluid. After activation of the adhesive, the funnel sheets are forced into engagement by the stepped pressure members, which move toward each other when their raised shoulders drop into the cut-out portions 36. The wrapper or cover 24 also can be provided with apertures 37, for cooperating with hooks, pickers, or the like, to facilitate transporting of the film unit in associated photographic apparatus.

The fluid collecting mechanism or trap 9 includes a relatively stiff fluid-containing structure, for receiving any excess of the processing fluid from the trailing end of the recording portion, a funnel or conduit 38, including first and second sheets 39 and 40, that are similar in structure and function, and include a similar fluid activated adhesive, as the funnel 25 at the leading end of the unit, and elements 40a and 40b, that support the collecting mechanism in a relatively stiff manner at the trailing end of the image-recording portion. The containing portion has been illustrated as a folded over piece of sheet material 41 suitably sealed by an adhesive 41a at the two edges, and secured by an adhesive 41b to the elements 40a and 40b, to insure confinement without leakage of any excess processing fluid. Since the illustrated film unit is intended to be used with apparatus having stepped pressure-applying members, as described in previously mentioned application Ser. No. 70,836, the collecting mechanism need not be provided with internal spacers, or the like, that often are used for separating the pressure members as the trailing end of the film unit passes therebetween. At its leading ends, lips 42 of the folded sheet extend to the trailing end of the image-recording portion, where they are provided with cut-out portions 43, that are similar in structure and function to the lips 35 and cut-out portions 36 at the leading end of the unit.

Additional cooperating features, and operation of the film unit

As briefly mentioned above, the reservoir means are coupled to the image-recording portion by coupling means that serve numerous somewhat interrelated functions. The coupling means are strong enough to permit handling of the film unit by the reservoir means during transporting of the film unit in photographic apparatus, as well as during processing after removal of the film unit from the apparatus. The coupling means also supports the reservoir means on the image-recording portion in a relatively stiff manner, so the entire unit will remain substantially flat, with no loose, limp or floppy portions, even when the unit is held at only one end. However, the coupling still further is especially adapted to be parted easily, for separating the reservoir means from the image-recording portion, and for providing a final print that is unincumbered by the reservoir means, at sometime after processing has been initiated. Moreover, such separation retains the above-mentioned seals intact at the respective ends of the reservoir means and the image-recording portion.

All of the above, and still further advantages of the coupling means that will become apparent from the present description, are provided by a coupling means that is relatively strong when handled in certain ways, but that is relatively weak when handled in other ways.

Referring now to FIGS. 1–6, and first to the leading end of the film unit, the coupling means comprises various parts of the film unit already partially described, and includes the funnel or conduit 25, in cooperation with the elements 26 and 27 of the fluid supply mechanism, and the leading ends of the photo-sensitive element 11 and process sheet 13. As these parts now will be further described, the funnel or conduit sheets 33 and 34 each define a first section 61, securely and permanently attached to the supply mechanism, a second section 63, securely and permanently attached to the image-recording portion, and an intermediate section 65 that is partable to separate the first and second sections and to release the supply mechanism from the image-recording portion.

Hereinafter, the funnel or conduit sheets 33 and 34 will be described as coupling means, coupling sheets, or the like, when referring to their coupling functions, and as funnel or conduit sheets, or the like, when referring to their fluid directing functions. It should be understood, however, that the same structural elements could accomplish both functions or separate elements could be utilized to accomplish each function.

The coupling means is constructed from sheet materials that are strong in tension but weak in shear. Such materials permit the use of camera mechanisms that can pull on the supply mechanism during film advance without causing a premature separation of the supply or collecting mechanisms from the image-recording portion. They also permit handling of the film unit by the supply and collecting mechanisms during and after processing without premature separation of such mechanisms from the image-recording portion. However, at some desired later time, when disposal means are available, the mechanisms easily can be separated by applying a shearing, tearing, or sharp bending force thereto.

One material found suitable for the coupling means or sheets 33 and 34, is a Rheinlaender Portfolio Creaseproof Paper offered by the Rheinlaender Paper Company of Rheinlaender, Wisconsin. Such paper comprises 5% hardwood bleached kraft, 15% hardwood bleached sulfide and 80% softwood bleached sulfide, and possesses the following properties:

Basic weight _____ 25.4 lb./3000 sq. ft.
Fold durability:
    Machine direction _____ 2764 folds before breaking.
    Across machine direction ___ 625 folds before breaking.
Tensil strength:
    Machine direction _____ 6.7 kg./15 mm. width.
    Across machine direction ___ 3.3 kg./15 mm. width.
Tear strength:
    Machine direction _____ 10 g. Elmendorf test.
    Across machine direction ___ 12 g. Elmendorf test.
Bursting strength:
    (Mullen test 3 mm. $\phi$) _____ 22 lb./sq. in.
Wet strength:
    (at room temp.) _____ 2 kg./15 mm. width.

The tensil strength of the coupling means preferably is 270 to 650 times greater than its shear strength. Howevr, a much smaller difference, e.g. a factor of 10 or more, would be sufficient in certain cases.

It is important to the aesthetic appearance of the final print that the leading edges of the image-recording portion present a clean and even appearance after the supply means is separated therefrom. This is accomplished, in accordance with one aspect of the present invention, by cutting the major portion of the leading edges during manufacture, when it can be done most accurately, and by using only very thin elements for the partable coupling means. Thus, the partable sheets 33 and 34 are relatively thin as compared to the precut photosensitive element and process sheet. The latter precut element and sheet together preferably define an edge that is at least twice as thick as the sheets 33 and 34 together. Thus, when the final print edge is viewed, the visible part will consist mainly of such precut element and sheet, and only a small portion of the parted sheets will be visible. In the preferred embodiment, the sheets 33 and 34 each are approximately .00175 inch thick, while the photosensitive element is about .007 inch thick, and the process sheet is about .005 inch thick.

Similarly, the best results are obtained when the location of the partable section is established very close to or right at the precut leading edges of the photosensitive element and process sheet. This is accomplished by the elements 26 and 27 of the supply mechanism; that are constructed from materials similar to those of the photosensitive element or process sheet, and that are spaced only slightly from, or even contact, the leading edges of the image-recording portion. Remembering that the coupling sheets 33 and 34 are permanently secured together upon the initiation of processing, and that their end sections 61 and 63 also are permanently and securely attached to the elements 26 and 27, on the one hand, and the photosensitive element and process sheet, on the other hand, it should now be apparent that parting section 65, of the coupling sheets 33 and 34 ordinarily will be very narrow and well defined closely adjacent to or at the leading end of the image-recording portion.

It also should now be apparent that the close spacing, or abutting relationship, between the elements 26 and 27 on the one hand, and the photosensitive element and process sheet, on the other hand, will prevent substantial flexing or folding between the fluid supply mechanism and the image-recording portion, even though the coupling sheets themselves are very flexible.

The exact location, as well as the ease of the parting, can still further be effected by the nature of the precut edges adjacent the parting section. Thus, the photosensitive element and process sheet each can be cut at slight opposite angles extending forwardly and inwardly toward the coupling sheets to provide shearing edges against which the sheets can be torn. Or, in like manner, the edges could have slightly roughened edges or burrs for familitating tearing. Of course, any means for still further facilitating the parting should not be such as to detract substantially from the appearance of the final print edge.

It also is preferable to a cleanly sheared edge that the coupling sheets, if paper, comprise a paper constructed from short fibers that pull apart, or, if from long fibers, then from fibers that break during parting rather than merely pulling apart. Similarly, it is important, for best results, that the adhesives between the coupling sheets and the elements 11, 13, 26 and 27 are substantially stronger than the shear or tearing strength of the coupling sheets.

The intermediate or parting section 65 of the coupling means passes through and divides the adhesive area of the coupling sheets to provide seals at both the leading and trailing ends thereof even after separation of the supply mechanism from the image-recording portion. This is particularly advantageous in simplifying the manufacture of the film unit, and also reduces its length slightly, because the adhesive or other sealer can be coated over substantially the entire one surface of each funnel sheet to provide a single sealing area that later is divided to provide two such areas.

Referring now to the trailing end of the image-recording portion, the funnel 38 also serves as a coupling means, and includes first, second and third sections 69, 71 and 73 that correspond and operate in a manner similar to sections 63, 61 and 65, respectively, of coupling means 38, for separating the collecting mechanism from the image-recording portion.

Referring now to FIGS. 1 and 3–5, and to the operation of the preferred film unit, it is intended to be supplied in a laid-out condition with the supply and connecting mechanisms extending outwardly from and in substantially the same plane as the image-recording portion at the leading and trailing ends thereof, respectively. After exposure of the photosensitive element, the film unit is transported between a pair of juxtaposed pressure-applying members, in associated photographic apparatus, to rupture the container 23, distribute the processing fluid between the photosensitive element 11 and process sheet 13, and collect any excess fluid in the collecting structure 9. At the same time, the distributed processing fluid activates the adhesive or sealing sections at the leading and trailing ends of the unit, and the pressure members force such sections into tight contacting relationship to establish fluid tight seals between the supply mechanism and the leading end of the image-recording portion, and between the collecting mechanism and the trailing end of the image-recording portion.

The distributed processing fluid also activates or effects processing of the latent image in the exposed photosensitive element, and a visibly prresentable image, in this case a reflection print, is established in the photosensitive element. As described in the previously mentioned U.S. application Ser. No. 869,186, the processing fluid preferably includes an opacifier, that cooperates with an opaque layer in the photosensitive element, to permit immediate withdrawal of the film unit from the camera, where processing is completed.

Figure 4:
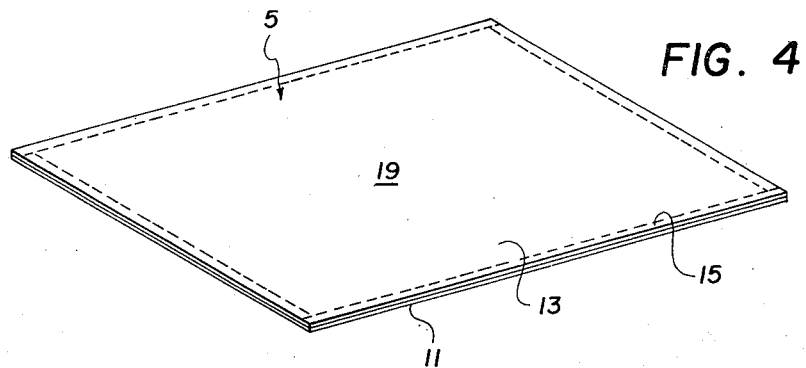
FIG. 4 is a pictorial view of the image-recording portion of the film unit illustrated in FIG. 1, depicting that portion after the reservoir means has been removed therefrom.
Figure 6:
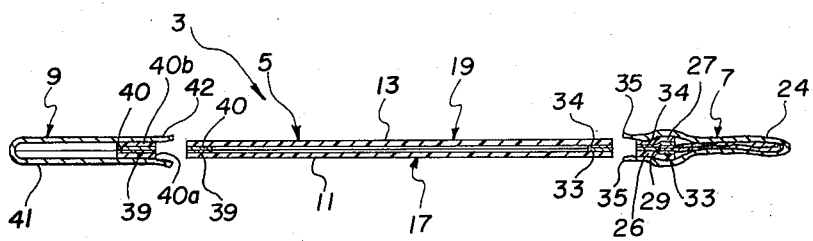
FIGS. 5 and 6 are cross-sectional views of the image-recording portion and reservoir means respectively, both before and after their separation from the recording portion in accordance with FIG. 3.

During film transport and processing, the supply and collecting mechanisms provide convenient and relatively stiff appendages for handling of the unit without requiring any contacting of the image-recording portion. This is permitted by the nature of the coupling between the image-recording portion and the supply and collecting mechanisms, which coupling is strong in tension, and supports the mechanisms in a relatively stiff manner on the recording portion. After processing, however, the coupling can be broken, as illustrated in FIGS. 3–5, to separate the supply and collecting mechanisms from the final print in the image-recording portion. This again is permitted by the nature of the coupling, which is relatively weak in shear, so it easily can be parted by tearing, sharp bending, or the like. Since the lips 35 and 42 of the supply and collecting mechanism wrappers extend over the image-recording portion without any significant coupling therebetween, they easily will be pulled and separated from the image-recording portion upon parting of the coupling means, and will not intefere with separation of such mechanisms from the recording portion.

DESCRIPTION OF ALTERNATIVE EMBODIMENTS

Figure 7:
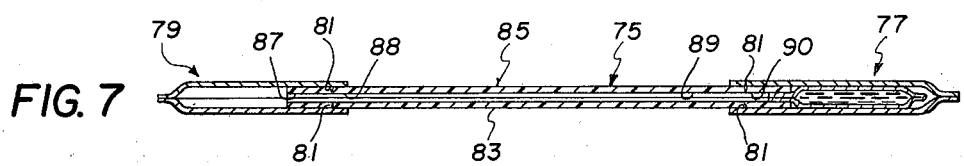
FIGS. 7 and 8 depict alternative embodiments of a film unit in accordance with the present invention.
Figure 8:
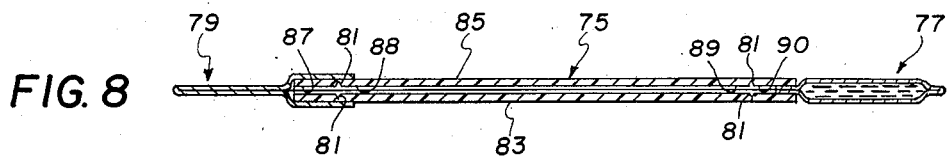

Referring now to FIGS. 7 and 8, two alternative embodiments of the invention are illustrated, comprising an image-recording portion 75, a supply mechanism 77, and a collecting mechanism 79, that are similar in most respects to those illustrated and described in connection with the preferred embodiment. However, in this alternative embodiment, the partable couplings between the mechanisms and the image-recording portion are provided by scores 81 in the photosensitive element 83 and in the process sheet 85. In FIG. 7, the scores are in the external surfaces of the photosensitive element and process sheet, while in FIG. 8, the scores are provided on internal surfaces thereof. These embodiments eliminate the need for a separate funnel or coupling means, reduce the number of parts of the film unit, and facilitate the manufacture of the film unit by reducing the number of small parts that must be handled during assembly. Sealing at the ends of the image-recording portion, as well as the supply and collecting mechanisms, is provided in a manner similar to that of the preferred embodiment, by an adhesive, or the like, at 87, 88, 89 and 90, that is activated by the processing composition.

DESCRIPTION OF ANOTHER ALTERNATIVE EMBODIMENT

Figure 9:
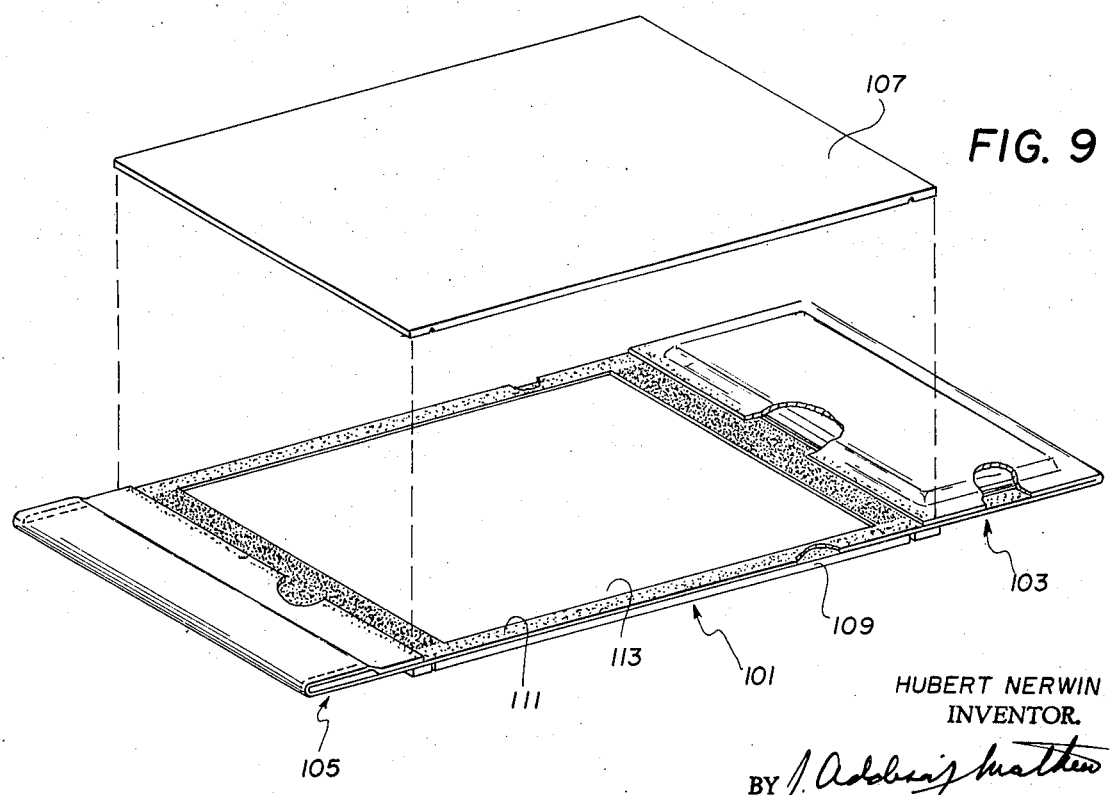
FIG. 9 is partially exploded view of yet another embodiment in accordance with the present invention, and especially depicting a simplified manner in which such a film unit might be assembled.

Referring now to FIG. 9, yet another embodiment of the film unit has been illustrated, comprising an image-recording portion 101, a supply mechanism 103, and a collecting mechanism 105.

The image-recording portion includes a photosensitive element 107, and a process sheet 109, that are similar in most respects to those illustrated and described in connection with the above preferred and alternative embodiments. In this embodiment, however, the covers or wrappers of the supply and collecting mechanisms are defined by a single sheet 111 that is laid across the photosensitive element and wrapped around the supply and collecting mechanisms. This sheet serves not only to cover the mechanisms, but also is the partible coupling means between these mechanisms and the image-recording portion. Still further the sheet 111 comprises a mask 113 for defining the edges of the final print.

This embodiment is especially designed to permit manufacture of most portions of the film unit in white light, after which the photosensitive element may simply be placed over the preassembled portion and secured thereto, thus substantially reducing the number of and simplifying the operations that must be completed in the absence of light.

It should now be apparent that the releasable coupling provided by the present invention permits removal of fluid reservoir means from the image-recording portion or final print of an improved self-processing film unit. However, it also should be noted that the coupling is such that it will not suggest or psychologically compel immediate removal. Instead, the reservoir means can be left as appendages to the image-recording portion or print to facilitate its handling during and after processing. The reservoir means also can be left with the print until some time after processing when waste disposal means are convenient. Similarly, and assuming the reservoir means are removed immediately, they are sealed against leakage and can be pocketed or otherwise held in almost any convenient place until disposal is convenient. Moreover, the separated parts are relatively small and easily held even in a small space until disposal is convenient.

While the coupling means has been described as preferably being parted by a shear force, it should be apparent that the break also could be effected by a combination of forces. For example, a sharp bending of the supply mechanism relative to the image-recording portion will apply sufficient leverage to break the coupling mainly by tension, even though its tensil strength is relatively high. This will be especially true when the edges of the image-recording portion provide a sharp fulcrum point, or the like, for concentrating such forces. Similarly, even a low shear or tensile force can effect parting easily when such force is concentrated at a single location, such as at one lateral edge of the coupling means. However, the coupling is relatively strong when the reservoir means are pulled outwardly in a straight line or plane extending from the leading and/or trailing ends of the image-recording portion. In fact, with the preferred Rheinlaender paper mentioned above, the coupling ordinarily cannot be broken in that manner by a person of average strength without other assistance.

The invention has been described in detail with particular reference to a preferred embodiment thereof, but it will be understood that variations and modifications can be effected within the spirit and scope of the invention.

I claim:

1. In a photographic film unit for use in a camera having means for exposing and for initiating processing of the film unit; the film unit comprising:

an image-recording portion for recording a latent image processable by a processing fluid to establish a visibly presentable image;

reservoir means for accommodating the processing fluid; and means for coupling said reservoir means to said image-recording portion, the improvement wherein said coupling means comprises an integral element having a first section permanently attached to said image-recording portion, a second section permanently attached to said reservoir means, and a third section joining and intermediate said first and second sections, said third section being easily partable to separate said reservoir means from said image-recording portion.

2. A photographic film unit as claimed in claim 1, wherein said coupling means is arranged for directing the processing fluid between said reservoir means and said image-recording portion.

3. A photographic film unit as claimed in claim 1, wherein said image-recording portion defines a leading end, said reservoir means includes a container of processing fluid, and said coupling means is arranged for directing the processing fluid from said contaner to said leading end.

4. A photographic film unit as claimed in claim 1, wherein said image-recording portion defines a trailing end, said reservoir means includes a collector for the processing fluid and said coupling means is arranged for directing the processing fluid from said trailing end into said collector.

5. A photographic film unit as claimed in claim 1, wherein said image-recording portion defines leading and trailing ends, said reservoir means includes a container of the processing fluid and a collector for the processing fluid and said coupling means includes two sets of said first, second and third sections, respectively, one set coupling said container to said leading end, and one set coupling said collector to said trailing end.

6. A photographic film unit as claimed in claim 1, wherein said coupling means includes means for sealing said reservoir means against the escape of the processing fluid therefrom after processing has been initiated.

7. A photographic film unit as claimed in claim 1 wherein said third section of said coupling means is relatively strong in tension permitting handling of said film unit by said reservoir means, and is relatively weak in shear permitting easy parting of the third section.

8. A photographic film unit as claimed in claim 7 wherein said third section includes an easily partable score.

9. A photographic film unit as claimed in claim 7 wherein said coupling means comprises a sheet of material extending between said reservoir means and said image-recording portion.

10. A photographic film unit as claimed in claim 9 wherein said sheet of material extends into said image-recording portion and forms a mask for defining the edges of the image.

11. A photographic film unit as claimed in claim 9 wherein adhesive means is provided on said first and second sections for sealing said reservoir means and said image-recording portion against the release of fluid after said reservoir means is separated from said image-recording portion.

12. A photographic film unit as claimed in claim 11 wherein said adhesive means extends across said partable section to define one sealed area before parting of said section and two sealed areas after such parting.

References Cited
UNITED STATES PATENTS

| | | | |
|---|---|---|---|
| 3,594,164 | 7/1971 | Rogers | 96—76 C |
| 3,636,845 | 1/1972 | Harvey | 96—76 C |
| 3,680,456 | 8/1972 | Nerwin | 96—76 R |

J. TRAVIS BROWN, Primary Examiner

J. L. GOODROW, Assistant Examiner

U.S. Cl. X.R.

95—13